T. Kealy,
Pitman.
No. 103,196. Patented May 17, 1870.

Witnesses:
A. W. Almqvist
Alex F. Roberts

Inventor:
Thos. Kealy
per Munn & Co.
Attorneys.

UNITED STATES PATENT OFFICE.

THOMAS KEALY, OF LEWISVILLE, TEXAS.

IMPROVEMENT IN PITMEN.

Specification forming part of Letters Patent No. 103,196, dated May 17, 1870.

*To all whom it may concern:*

Be it known that I, THOMAS KEALY, of Lewisville, in the county of Denton and State of Texas, have invented a new and useful Improvement in Crank and Pitman; and I do hereby declare that the following is a full, clear, and exact description thereof, which will enable others skilled in the art to make and use the same, reference being had to the accompanying drawings, forming part of this specification, in which—

Figure 1:
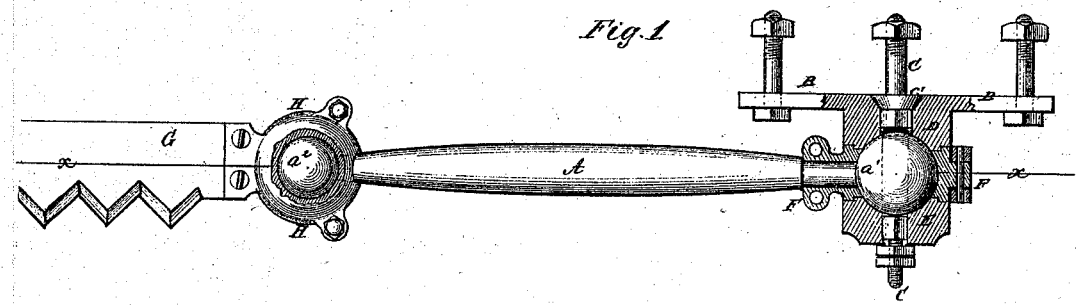
Figure 2:
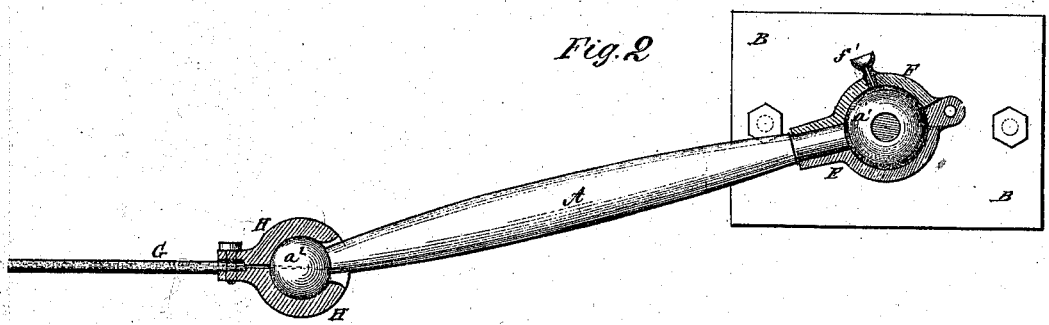

Figure 1 is a top view of my improved crank and pitman, partly in section to show the construction. Fig. 2 is a side view of the same, partly in section, through the line $x$ $x$, Fig. 1.

Similar letters of reference indicate corresponding parts.

My invention has for its object to furnish an improved crank and pitman for use upon mowing-machines, reapers, pumps, and other places where it is necessary to change crank or circular motion into rectilinear motion, and which shall be so constructed as to greatly diminish the strain and wear attending such change of motion when made in the ordinary manner; and it consists in the construction and combination of the various parts, as hereinafter more fully described.

A represents the pitman, which is made with a ball upon each end, the ball upon the crank end being made considerably the larger. B is the plate to which the journal or crank-pin C is attached, and which is designed to be securely attached to or formed solidly upon the wheel or crank-arm with which the pitman A is to be connected. Upon the outer side of the middle part of the plate B is formed, or to it is securely attached, a projection or block, D, the outer end of which is concaved to receive one side of the larger ball, $a^1$, of the pitman A.

Through the center of the projection or block D is formed a hole to receive the crank-pin or journal C, said hole being made round for a short distance from the concave surface and square for the rest of its length, and at the same time slightly tapering, so that the said journal or crank-pin may always be held firmly to its seat. The end of the pin or journal hole upon the inner side of the plate B is countersunk to receive and form a seat for a collar, $c'$, formed upon the pin or journal C, as shown in Fig. 1.

The crank-pin or journal C may extend beyond the plate B, to serve as a bolt for more thoroughly securing the plate B to the wheel or crank-arm.

E is a detached block, concaved to fit upon the ball $a^1$, and perforated with a hole, partly round and partly square, being made exactly similar to the projection D. The forward end of the journal or crank-pin C passes through the block E, and has a screw-thread cut upon its projecting end to receive the nut or nuts by means of which the parts are secured to each other. The edges of the concave blocks D E that are toward each other are rabbeted upon their outer sides, as shown in Fig. 1, to receive the cap F. The cap F is made in two parts, hinged to each other at one end, as shown in Figs. 1 and 2, and so formed at their other ends as to embrace the pitman A, where they are secured to each other and to said pitman by bolts passing through ears formed upon said ends; or, if desired, the ends of the cap F may be secured to each other and to the pitman by a bolt passing through said ends and through said pitman. The former construction I prefer. By this construction the cap F will be carried with the end $a^1$ of the pitman A, while the concave blocks D E will be stationary.

The cap F is designed to protect the working parts from dust and dirt, and at the same time to confine the oil or other lubricator and prevent it from running or being thrown off.

The cap F should be provided with an oil-cup, $f'$, for the convenient introduction of the oil, the position of said cup depending upon the position in which the pitman A works.

The other end of the pitman A is connected with the cutter-bar G or other thing to be moved by the plates H, which are securely bolted to each other and to the cutter-bar G or other object to be moved. The adjacent sides of the plates H are concaved to receive the ball $a^2$, formed upon the end of the pitman A. The hole between the socket-plates H, through which the pitman A passes, is elongated, as shown in Fig. 2, so that the pitman may have the necessary play.

By this construction the strain and wear will be almost entirely removed, and the motion will be easy and steady in all its parts.

Having thus described my invention, I claim as new and desire to secure by Letters Patent—

1. The combination of the concaved blocks D E, journal or crank-pin C, plate B, cap F, and end or ball $a^1$ of the pitman A, substantially as herein shown and described, and for the purpose set forth.

2. The combination of the socket-plates H with the end $a^2$ of the pitman A, said plates H being constructed substantially as herein shown and described, to adapt them for attachment to the ball $a^2$ of the pitman A and to the object to be moved, as and for the purpose set forth.

3. The combination of the plate B, crank-pin or journal C, concaved blocks D E, cap F, pitman $a^1$ A $a^2$, and socket-plates H with each other, said parts being constructed, arranged, and operating substantially as herein shown and described, and for the purpose set forth.

The above specification of my invention signed by me this 8th day of November, 1869.

THOMAS KEALY.

Witnesses:
 JOSEPH MINOR,
 JOHN A. HARRIS.